UNITED STATES PATENT OFFICE.

ANDREW MALINOVSZKY, OF CHICAGO, ILLINOIS, ASSIGNOR TO HARRY H. RANDOLPH, OF CHICAGO, ILLINOIS.

MANUFACTURE OF BUILDING MATERIAL.

1,107,431.  Specification of Letters Patent.  Patented Aug. 18, 1914.

No Drawing.  Application filed December 6, 1911. Serial No. 664,186.

*To all whom it may concern:*

Be it known that I, ANDREW MALINOVSZKY, a citizen of the United States, and a resident of Chicago, in the county of Cook and State of Illinois, have invented a certain new and useful Manufacture of Building Material; and I do hereby declare the following to be a full, clear, and exact description of the invention, such as will enable others skilled in the art to which it appertains to make and use the same.

Numerous patents have been issued for manufacturing lime silica brick and other fireproof building materials in this line and also electrical insulation, but I have found from experiments that all of these, so far as I am aware, fail to stand the fire and weather tests which are required by architects for building purposes, the fluxing or cementing properties of such materials being insufficient to prevent disintegration and crumbling when subjected to fire or the weather.

The object of my invention is to produce a stone-like substance from which fire-brick, fire-doors, columns, caskets, electrical insulation and coverings for roofs, ceilings, floors, partitions, etc., can be cheaply manufactured, and which when hardened can be easily worked with carpenters' tools.

It is also the object of my invention to produce an article which is capable of resisting an intense heat, and which can be used as a sound-proof packing, and also as a non-conductor for heat and cold, and is impervious to moisture and unaffected by temperature changes, thus adapting it for a multiplicity of uses.

In the making of my improved brick or other article, I preferably combine the following ingredients in substantially the range of proportions stated, but such proportions may be varied without departing from the spirit or scope of the invention:—

Silicious sand or rock............ 50 to 75%
Granite rock.................... 10 to 30%
Calcium carbonate............... 6 to 15%
Serpentine rock, verd-antique, steatite, which are hydrous magnesia silicates or other fibrous material................ 15 to 35%
Fire clay....................... 2 to 8%

The granite rock can be replaced by gneiss, feldspar, gabbro, diorite, and the like, as all of such ingredients contain the same fluxing properties as granite and have the same action in the composition. It is to be understood that the term "granite rock" when used is intended to include said other or analogous ingredients, and also that the term "serpentine rock" includes other analogous fibrous ingredients such as verd antique, and steatite, as stated, and also mineral wool, or other similar material which has a fibrous structure.

In the practical and successful carrying out of my improved process, it is of prime importance to evenly and thoroughly calcine the calcium carbonate, as this step is one of the main factors in the process. By extensive experiments I have found that in calcining the calcium carbonate the best results are obtained by breaking the stones into uniform size of from substantially four to five inches in diameter before placing in a kiln so that the calcination can be uniformly produced by a low temperature, which is preferably gradually raised. When the stones are not uniformly broken a high and long heating is required, thus producing a bad result, as the small pieces and the surface portions of the large pieces are burnt, while the interior of the large pieces are not calcined at all, and rendering the product incapable of use in my process. The calcination of the calcium carbonate changes it to calcium oxid. When the calcium carbonate has been calcined and the resultant product is reduced to a fine powder and mixed with the silicious sand, serpentine rock, granite rock and fire-clay, which ingredients are also preferably finely ground, sufficient water is added to the mixture to form a thick paste or mortar-like mass, and the calcium oxid is thereby converted into calcium hydroxid. The whole mass is now preferably allowed to rest for several hours to permit a thorough soaking of the water through the mixture. Where the composition is to be subjected to an intense heat the serpentine rock should also be thoroughly calcined to expel all the water of crystallization therefrom.

The composition having been prepared as above stated, is pressed or molded in any well known manner into the desired forms and then preferably placed in a hardening cylinder where it is subjected from eight to ten hours to a steam pressure of, say 125 to 150 pounds. Large pieces such as doors, moldings, etc., should be dried before placing in the hardening cylinder to avoid a cracking of the same.

When removed from the hardening cylinder the brick or other articles are saturated in a solution of two volumes of sodium silicate, of a specific gravity of thirty to thirty-five Baumé, with one volume of a two per cent. solution of sodium chlorid. The sodium chlorid may be replaced by other salts or acids such as sulfuric acid, but I prefer to use sodium chlorid as it is cheap and economical, and produces no gas. The sodium chlorid should be allowed to stand for several hours before adding the sodium silicate, to permit the water to become thoroughly saturated with the salt. Care must be taken in the preparation of this solution, as by some processes of producing sodium chlorid the solution always contains sodium sulphate together with magnesium or calcium chlorid. The chlorids of magnesium and calcium both attract moisture and when present in the solution, cause the articles saturated therewith to become moist in the air. Pure salt or sodium chlorid does not however attract moisture. The only function of the sodium chlorid in the solution is to act as a retarder to the sodium silicate to prevent a gelatinizing thereof. If the retarder is omitted from the solution the sodium silicate will gelatinize as soon as it comes in contact with the composition and a quick chemical reaction takes place between the calcium and sodium silicate forming calcium silicate. The same action takes place when the retarder is rich in salt. This causes the sodium silicate to precipitate, and the articles in the bottom of the tank will stick together and those in the upper portion of the solution will be liable to disintegrate. By the use of a diluted solution of sodium silicate and sodium chlorid the retardation to the gelatinizing of the sodium silicate occasioned by the sodium chlorid, permits the sodium silicate to penetrate to the interior of the composition and thoroughly saturate it. A slow drying of the composition when thus saturated causes a dense cementation to take place, and the silicate and lime has been converted by the chemical reaction into magnesium calcium silicate. By the use of the sodium silicate and sodium chlorid solution in this manner a complete impregnation of the composition with the two chemicals, which are of mineral character, is effected, and these salts are deposited in sufficient quantity over the composition to leave a hard dense substance after it is gradually dried. This substance attaches itself as a cement to the composition and forms a homogeneous mass which is incapable of lamination and is fire resisting to a very high degree.

Articles produced by this process, while comprising a hard, dense mass, are capable of being easily worked with carpenters' tools and will stand 3,000 degrees Fahrenheit without destruction. The material produced forms an excellent fire-proof covering for roofs, ceilings, walls, floors, etc., and can be used for fire-doors, columns, caskets and electrical insulation. It is also impervious to moisture, unaffected by temperature and a non-conductor to sound and heat, thus adapting it for use as a sound proof packing, and in the construction of refrigerators, etc., and is not subject to decay, nor does it harbor vermin. Articles can be made to imitate wood, stones, granite, marble, etc., or produced in any color by mixing color pigments in the composition or the solution, and can also be painted, varnished, enameled, polished or veneered. If the articles are not to be subjected to intense heat the fire clay can be omitted from the composition without injuring the strength thereof. It will, of course, be understood that the proportions of the different ingredients named may be varied to suit requirements, and that the composition is not restricted to the use of the ingredients stated, but covers the chemical ingredients thereof.

Having thus described my invention, what I claim as new and desire to secure by Letters Patent, is,—

1. The process of making building material, consisting in mixing silicious sand, granite rock and calcium oxid, the major portion of the mass being sand, wetting the mixture to a molding consistency, molding said mixture, subjecting the same to the action of steam, and then saturating the mixture with a solution of sodium silicate and a retarder, substantially as described.

2. The process of making building material, consisting in mixing silicious sand, granite rock, calcium oxid, and fire clay, wetting the mixture to a molding consistency, molding said mixture into the desired articles, subjecting said articles to the action of high pressure steam, and then saturating said articles with a solution of sodium silicate and sodium chlorid, substantially as described.

3. The process of making building material, consisting in mixing silicious sand, granite rock, calcium oxid, fibrous mineral material, and fire clay, wetting the mixture to a molding consistency, molding said mixture into the desired articles, subjecting said articles to the action of high pressure steam, and then saturating said articles with a solution of sodium silicate and sodium chlorid, substantially as described.

4. The process of making building material, consisting in mixing silicious sand, 50 to 75%, granite rock, 10 to 30%, and calcium oxid, 6 to 15%, wetting the mixture to a molding consistency, molding said mixture, subjecting the same to the action of steam, and then saturating the mixture with a solution of sodium silicate and a retarder, substantially as described.

In testimony whereof, I have hereunto signed my name to this specification in the presence of two subscribing witnesses.

ANDREW MALINOVSZKY.

Witnesses:
C. W. OWEN,
M. Q. OPPENHEIM.